United States Patent [19]
Edwards

[11] Patent Number: 5,735,337
[45] Date of Patent: Apr. 7, 1998

[54] CLEANING DEVICE INTERNALLY MOUNTED WITHIN A TUBULAR FILTER

[75] Inventor: John W. Edwards, Arcadia, Fla.

[73] Assignee: Advanced Contracting & Hedging, Inc., Alva, Fla.

[21] Appl. No.: 203,299

[22] Filed: Mar. 1, 1994

Related U.S. Application Data

[63] Continuation-in-part of Ser. No. 34,806, Mar. 19, 1993, abandoned.

[51] Int. Cl.⁶ .............................. B01D 46/04; A47L 5/14
[52] U.S. Cl. ................. 165/41; 165/119; 55/294; 55/269; 55/385.3; 55/302
[58] Field of Search .................. 165/119, 41; 55/294, 55/269, 290, 400, 385.3, 302

[56] References Cited

U.S. PATENT DOCUMENTS

| | | | |
|---|---|---|---|
| 2,500,747 | 3/1950 | Ellis | 55/294 |
| 2,591,198 | 4/1952 | Ringe | 55/294 |
| 3,155,473 | 11/1964 | McNeil | 55/294 |
| 3,837,149 | 9/1974 | West et al. | 55/269 |
| 3,958,296 | 5/1976 | Fell | 55/294 |
| 4,353,722 | 10/1982 | Berz | 55/294 |
| 4,810,270 | 3/1989 | Terry et al. | 55/294 |

FOREIGN PATENT DOCUMENTS

| | | | |
|---|---|---|---|
| 2282927 | 3/1976 | France | 55/294 |
| 1916099 | 4/1980 | Germany | 55/294 |
| 0059236 | 5/1977 | Japan | 165/119 |

OTHER PUBLICATIONS

Phillips, R.L.; "Pruning Principles and Practices for Florida Citrus"; Florida Cooperative Extension Service Institute of Food and Agricultural Sciences, Un. of Florida, Circular 477, pp. 3–23, (no date).
HD 1600 Dual Boom Hedger Brochure; Tol Incorporated, (no date).
HD 1600 K Dual Boom Hedger Brochure and Price List; Tol Incorporated, (no date).
HD 2200 Dual Boom Hedger Brochure and Price List; Tol Incorporated, (no date).
140G Motor Grader Brochure; Cat (1990).
Photograph of Trailer Mounted Dual Boom Hedger; Citrus Systems, Inc. (no date).

*Primary Examiner*—John K. Ford
*Attorney, Agent, or Firm*—Oliff & Berridge

[57] ABSTRACT

A pruning apparatus includes a vehicle or other mobile platform, a stabilizing member pivotally supported by the mobile platform, at least one cutting blade supported by the stabilizing member, and a leveling mechanism connected to the stabilizing member for maintaining a substantially level operating position of the stabilizing member. An automatic radiator cleaning device avoids accumulation of debris on the vehicle engine radiator or its protective screen or filter during pruning operations.

16 Claims, 15 Drawing Sheets

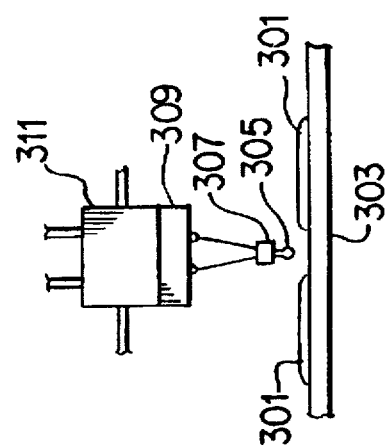
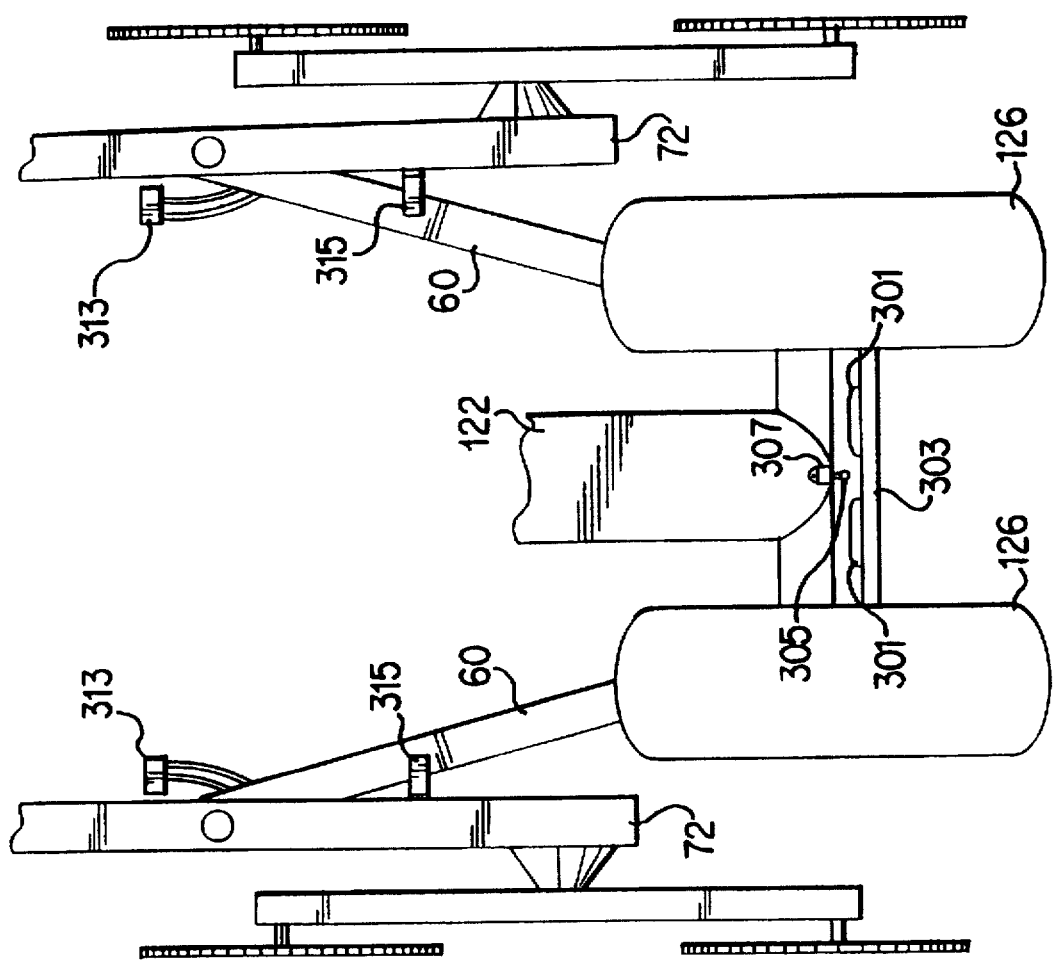

5,735,337

CLEANING DEVICE INTERNALLY MOUNTED WITHIN A TUBULAR FILTER

This application is a continuation in part of Ser. No. 08/034,806, filed Mar. 19, 1993, now abandoned.

BACKGROUND OF THE INVENTION

The present invention relates to a pruning apparatus, and more specifically to a vehicle mounted pruning apparatus. The pruning apparatus is adapted for use in hedging, topping and/or skirting operations.

When a grove of trees is laid out, each tree is allotted a unit of space in which to grow. When the space is exceeded, crowding occurs and results in inadequate light conditions, loss of foliage and fruit production in the lower portion of the tree, hindrance of cultural and harvesting operations, and interference with spraying operations. Moreover, when trees get excessively tall, they are more difficult and expensive to harvest, spray coverage at the tops for pest and disease control is poor, and the fruit at the tops is often smaller and otherwise of lower quality. To avoid these problems, alleys between tree rows should be kept sufficiently wide (by "hedging" the sides of the trees) to accommodate orchard equipment and to provide adequate light access to the sides of the trees, the trees should be "topped" to keep them from getting excessively tall, and the trees may also need to be "skirted" above the ground. See, e.g., R. L. Phillips, *Pruning Principles and Practices for Florida Citrus*, Circular 477, Florida Cooperative Extension Service, University of Florida, Institute of Food and Agricultural Sciences. Accordingly, hedging, topping and skirting operations, wherein the sides, tops and bottoms of trees are pruned back, have become common practice, particularly since the development of large scale, heavy duty pruning equipment.

FIG. 1 shows an exemplary, conventional pruning apparatus having a pruning structure 10 pivotally attached to a vehicle 1. The pruning structure 10 includes left and right symmetrical halves, each of which includes a plurality of boom members 11, 12, 13. A plurality of blade support members 15 are rotatably supported on pruning structure 10. Each blade support member 15 rotatably supports a pair of circular cutting blades 16. Boom members 11, 12, 13 are pivotable with respect to one another, such that pruning structure 10 is laterally extendable and pivotable for vertical and angular hedging. When pruning structure 10 is fully extended, blades 16 can reach in excess of 20 feet. Similar equipment is available for topping and skirting operations. Hand-held and trailer mounted equipment is also available. See, e.g., the above-referenced *Pruning Principles* article and catalogs or other information available from TOL Incorporated of Barrow, Fla., and Citrus Systems Inc. of Winter Garden, Fla.

A problem arises in that the terrain on which a vehicle or trailer is traveling is quite rough and may include ruts and holes. As a result, during a pruning operation, especially when the pruning structure is fully extended, conventional vehicles and trailers may not be sufficiently stable and maneuverable. Moreover, if a vehicle or trailer tire drops into a hole in the terrain, the cutting blades will shift a substantial amount causing excessive pruning on one side of the vehicle or trailer and insufficient pruning on the opposite side.

An additional problem is that conventional topping apparatuses must pass by each side of a tree to be topped, rather than topping a tree in one pass from one side. Moreover, such topping apparatuses cannot be used for hedging operations.

Still further, conventional pruning apparatuses do not enable the rotating blades to be configured for a plurality of jobs. Moreover, when the vehicle supports a plurality of rotating blades, the blades must be timed so that they do not intersect during operation.

Yet another problem arises in that because of the cutting operations of the pruning apparatus, sawdust and other debris from the trees builds up and clogs the engine radiator or its protective screen or filter, resulting in potential overheating of the vehicle. Unless some type of automatic cleaning device is incorporated, the operator must then stop the operation to clear the radiator, screen or filter before any further pruning.

SUMMARY OF THE INVENTION

Accordingly, it is an object of the present invention to provide a pruning apparatus which overcomes the above-described problems in the conventional pruning equipment.

It is another object of the present invention to provide a pruning apparatus having a leveling mechanism to maintain a substantially level operating position of the cutting blades.

It is yet another object of the present invention to provide a pruning apparatus which is capable of topping a tree in a single pass from one side of the tree, and which can be adjusted to also serve as a hedging apparatus without the need to time the rotation of the blades.

It is yet a further object of the present invention to provide a pruning apparatus which includes a vehicle having a more stable and maneuverable construction.

It is still a further object of the present invention to provide a radiator cleaning apparatus for automatically cleaning the vehicle radiator during the pruning operation.

These and other objects and advantages of the present invention are achieved by providing a pruning apparatus which includes a mobile platform, a stabilizing member pivotally supported by the mobile platform, at least one cutting blade supported by the stabilizing member, and a leveling mechanism connected to the stabilizing member for maintaining a substantially level operating position of the stabilizing member.

In accordance with other aspects of the present invention, the leveling mechanism comprises means for sensing rotation of the stabilizing member from the level operating position beyond a predetermined limit, and means for adjusting the stabilizing member back to the level operating position in response to the sensing means. The sensing means may be a mercury switch attached to the stabilizing member, and the adjusting means may be at least one hydraulic cylinder connected to a pressure source, the hydraulic cylinder being supported by the mobile platform at a first end and being attached to the stabilizing member at a second end.

In accordance with yet another aspect of the present invention, the pruning apparatus includes a first, substantially horizontal plate member connected to the mobile platform; and a second, substantially horizontal plate member connected to the mobile platform but spaced from the second plate member; the stabilizing member being disposed between and pivotally attached to the first and second plate members for pivoting about a first axis.

In accordance with still another aspect of the present invention, the second plate member is attached to the first plate member by means of a support structure; a third, substantially vertical plate member is attached to the first plate member for pivoting about a second axis substantially perpendicular to the first axis; a fourth, substantially vertical plate member is fixed to the mobile platform, and a hook portion at an upper end of the third plate member is structured for hooking attachment atop the fourth plate member; and the leveling mechanism is connected between the support structure and the stabilizing member.

In accordance with yet other aspects of the present invention, the pruning apparatus includes at least one boom member pivotally attached to the stabilizing member, and at least one blade support member rotatably supported by the boom member, the cutting blade being rotatably supported by the blade support member. The boom member may be a telescoping boom member, and additional boom members may be included between the above-described boom member and blade support member. Two of the additional boom members may be pivotally attached to another boom member, and connected to a pivoting mechanism, so that the two boom members (each of which preferably supports a blade support member and two cutting blades) may be pivoted to vary an angle therebetween. The two boom members may be attached to opposite sides of the other boom member for pivoting about a common axis.

In accordance with another aspect of the present invention, the pruning apparatus includes a mobile platform supporting a plurality of boom members rotatably supporting a plurality of blade support members. The boom members are positioned with respect to each other and pivotable relative to each other such that areas encompassed by the rotating blade support members do not intersect. Alternatively, the pruning apparatus may include at least one main boom member pivotally attached at a first end to the mobile platform, at least one first blade boom member attached at a first fixing end to a second end of the main boom member, at least one second blade boom member pivotally attached at a second fixing end to the first fixing end of the at least one blade boom member, at least one third blade boom member pivotally attached at a third fixing end to an intermediate portion of the at least one second blade boom member, a first blade support member rotatably supported by the first blade boom member, a second blade support member rotatably supported by the second blade boom member, and a third blade support member rotatably supported by the third blade boom member, and at least one cutting blade rotatably supported by each of the first blade support member, the second blade support member, and the third blade support member.

The third blade boom member may also include an interim boom extension member, and the pruning apparatus may further include a first pivot connector connecting the first blade boom member and the second blade boom member to pivot relative to each other in a first plane, a second pivot connector connecting the second blade boom member and the interim boom extension member to pivot relative to each other in a second plane substantially perpendicular to the first plane, and a third pivot connector connecting the interim boom extension member and the third blade boom member to pivot relative to each other in a third plane substantially perpendicular to the second plane.

In accordance with yet other aspects of the present invention, the pruning apparatus includes a vehicle having a truncated grader chassis, at least two front wheels, and at least four rear wheels, with a frame support member attached to a forward portion of the vehicle chassis, at least one boom member connected to the frame support member, and at least one cutting blade supported by the boom member. The pruning apparatus may include a switching apparatus for automatically moving the boom structure and cutting blades away from the mobile platform or vehicle to prevent potential contact, and/or a lifting apparatus for raising rearward portions of rear wheel tandems to assist in turning.

In accordance with still a further aspect of the present invention, an automatic radiator cleaning device for a vehicle engine radiator includes a tubular filter rotatably mounted adjacent the radiator, the filter having an inside surface and an outside surface; a plurality of holes extending through the tubular filter; a device for rotating the tubular filter; and at least one brush member disposed in contacting relationship with the outside surface of the tubular filter. The tubular filter may be rotated by means of internal spaced blade members or a motor. The radiator cleaning device may also include a baffle disposed adjacent the tubular filter and juxtaposed with respect to the brush member so as to prevent debris removed by the brush member from re-accumulating on the tubular filter. The tubular filter may also be hinged to the vehicle.

In an alternative radiator cleaning arrangement, the device includes at least one air nozzle disposed inside the tubular filter and fixed to a corresponding at least one hollow nozzle shaft. The nozzle shaft extends radially from a hollow rotatable support shaft centrally disposed inside the filter. The support shaft is connected to a source of pressurized air, wherein upon actuation of the pressurized air source, the air nozzle directs pressurized air toward the inside surface of the filter while rotating the support shaft and thereby the nozzle shaft and the air nozzle. The air nozzle may be disposed at an angle relative to the nozzle shaft such that the pressurized air exiting the air nozzle causes the support shaft, nozzle shaft and air nozzle to rotate. Still further, the cleaning device may include a system for actuating the pressurized air source in accordance with an automatic timer or an operator controlled switch.

BRIEF DESCRIPTION OF THE DRAWINGS

These and other objects of the present invention will become apparent from the following detailed description of the preferred embodiments when taken in conjunction with the accompanying drawings, wherein:

FIG. 12 is a front, elevation view of a boom movement switching apparatus of the present invention;

FIG. 13 is an enlarged view of a portion of the switching apparatus of FIG. 12.

DETAILED DESCRIPTION OF PREFERRED EMBODIMENTS

Figure 2:
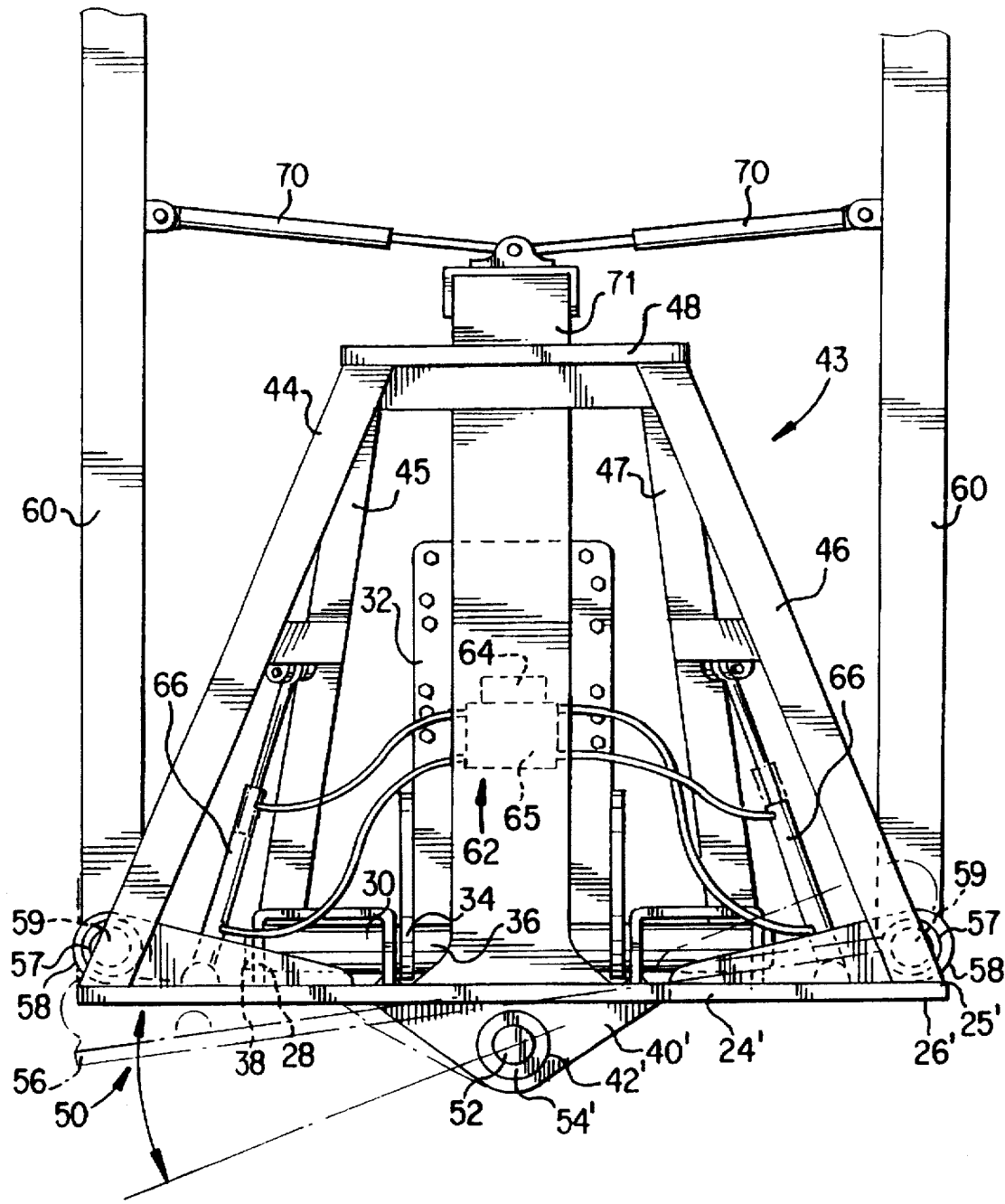
FIG. 2 is a front elevation view of the frame support member and leveling mechanism of the present invention.
Figure 3:
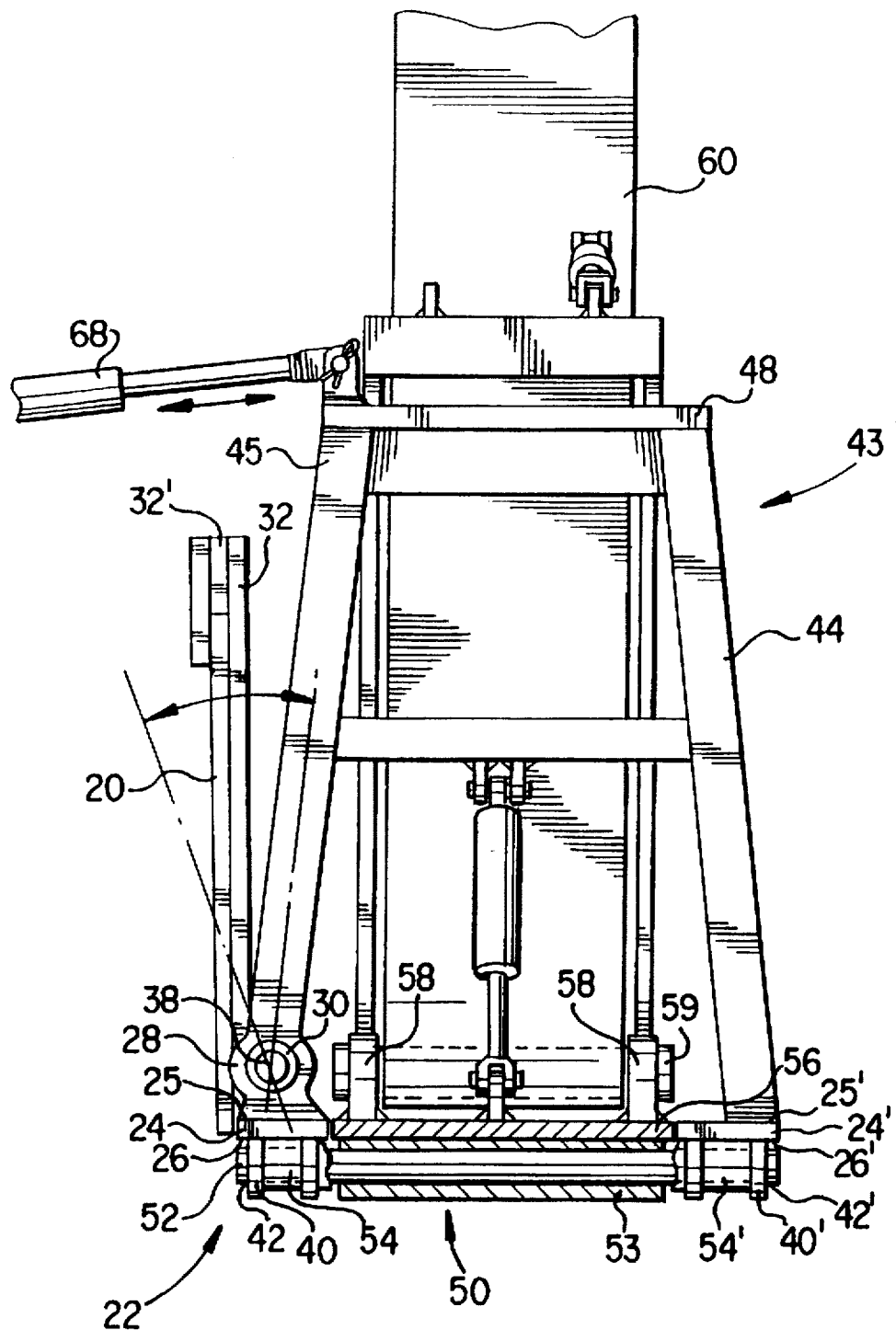
FIG. 3 is a side view, partially in cross section, of the frame support member and leveling mechanism of the present invention.

Referring to FIGS. 2 and 3, one embodiment of the pruning apparatus of the present invention includes a frame support member 22 supportable on a frame plate 20 of a mobile platform, such as a vehicle or trailer. Frame support member 22 preferably includes an inverse T-shaped structure which includes a laterally disposed base plate 24 having an upper side 25 and a lower side 26. At least two brackets 28 are attached to the upper side 25 of the base plate 24 by any suitable means, such as welding. Each of a pair of tubular bushings 30 is welded or otherwise fastened to at least one of the brackets 28. An elongated flat plate member 32 is pivotally attached between the two innermost brackets 28 by a pair of plate brackets 34 and a tubular support member 36. The support member 36 is axially aligned with the bushings 30. A pin 38 is press fitted into and extends through support member 36, and is pivotally supported by bushings 30, to secure flat plate member 32, thereby forming the inverse T-shape. At least one additional bracket 40 is attached to the base plate 24 at a substantially central lateral location on its lower side 26. Bracket 40 is perpendicular to brackets 28, and includes a hole 42. The axis of hole 42 is perpendicular to the axis of bushings 30 and support member 36.

Frame support member 22 further includes a support structure 43 which includes four support legs 44, 45, 46, 47 joined at the top by an upper support plate 48. Lower ends of support members 45 and 47 are respectively welded or otherwise fastened to the tops of brackets 28 at respective lateral sides of base plate 24. Lower ends of support members 44 and 46 are welded or otherwise fastened to an upper side 25' of a second base plate 24' which is spaced apart from base plate 24 in a longitudinal direction. At least one bracket 40' is attached to lower side 26' of second base plate 24'. Bracket 40' is parallel to bracket 40, and includes a hole 42' whose axis is aligned with the axis of hole 42 in bracket 40.

Plate member 32 includes a hook portion 32' at its upper end, which is dimensioned to hook over the top of frame plate 20 of the mobile platform. In this way, the entire pruning apparatus can be supported on frame plate 20 while it is being fastened thereto. Plates 20 and 32 include correspondingly located holes so that they can be firmly bolted to one another.

A stabilizing member 50 is pivotally attached to frame support member 22, via a pin 52 which is press fitted into a sleeve 53 and extends into and is supported within steel bushings 54, 54' in holes 42, 42' of brackets 40, 40', respectively. Sleeve 53 is connected to a plate 56 of stabilizing member 50 by any suitable means, such as welding.

Brackets 58 are fixed to the top surface of plate 56, and, together with bushings 57 and pins 59, pivotally support a pair of first boom members 60. A hydraulic cylinder 70, controlled by the operator, is disposed between each boom member 60 and a central support member 71 welded or otherwise fastened to plate 56, for angular adjustment of the boom members.

Figure 4:
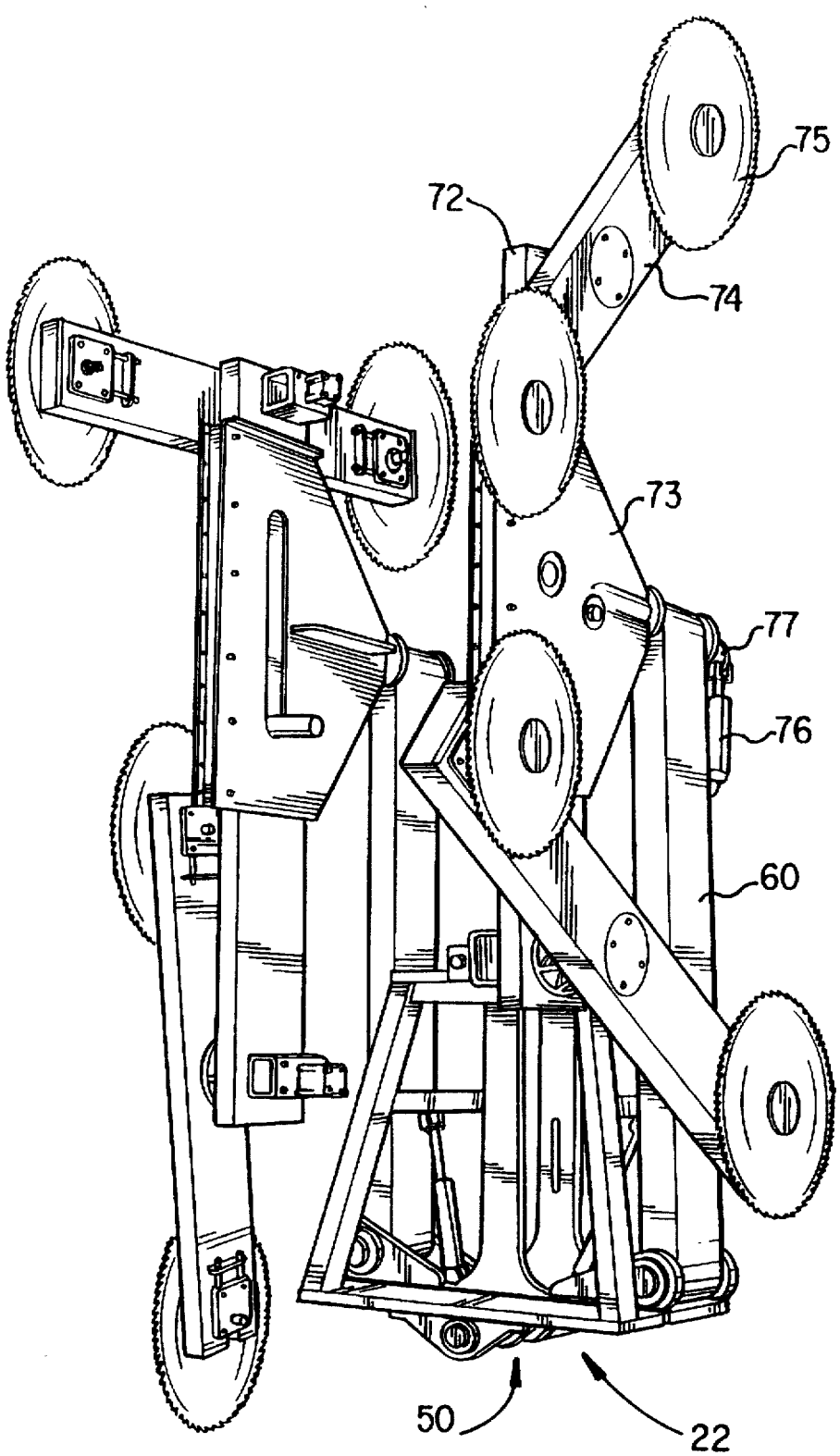
FIG. 4 is a perspective view of a conventional boom, blade support member and cutting blade structure attached to the frame support member of the present invention.
Figure 5:
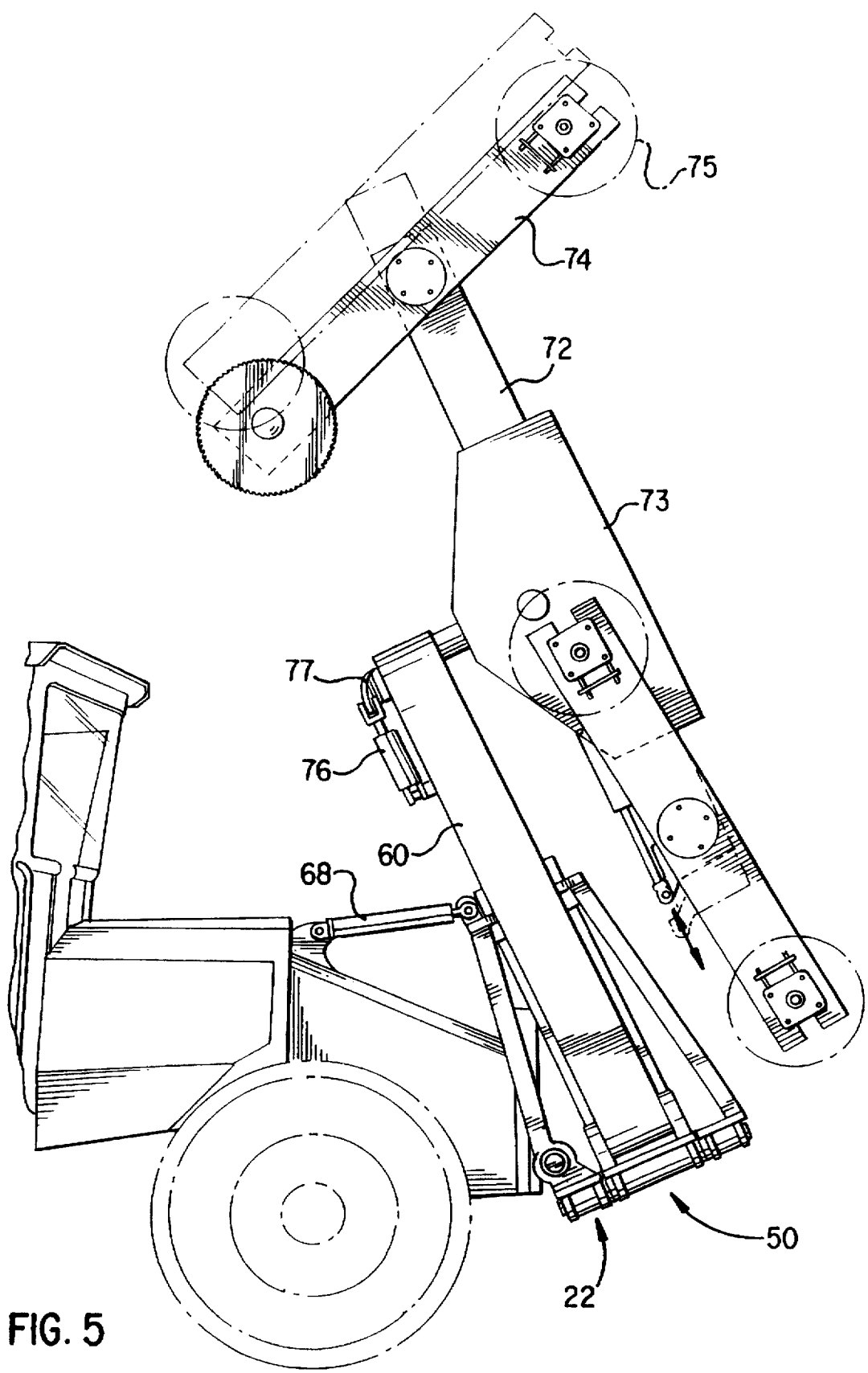
FIG. 5 is a side view of the apparatus of FIG. 4, mounted on a vehicle and depicting sliding boom adjustment and tilt capability.

FIGS. 4 and 5 depict a conventional boom, blade support and cutting blade structure attached to the frame support member of the present invention. A second boom member 72 is pivotally attached to each first boom member 60 within a slide member 73 within which the height of second boom member 72 can be adjusted. The relative positions of the first and second boom members are hydraulically controlled and maintained by the operator in a conventional manner by means of hydraulic cylinders 76 and crank levers 77. A blade support member 74 is rotatably supported at each end of each second boom member 72, and a circular cutting blade 75 is rotatably supported at each end of each blade support member 74.

The blade support members are rotated by hydraulic or other type motors and chain drives, and are timed such that they are rotated at the same speed but out of phase (i.e., 90° out of phase) with one another. The circular cutting blades are driven by a series of motors and belt drives. The drive chains are located within the booms, and the drive belts are located within the blade support members. The motor, chain and belt arrangements for the blade support members and the circular cutting blades are known in the industry. Rotary cutting blades are available in diameters ranging from approximately 20 inches to approximately 4 feet. The speed of rotation of the rotary cutting blades is a function of their size (e.g., 20 inch blades are typically rotated at over 3000 rpm).

Figure 6:
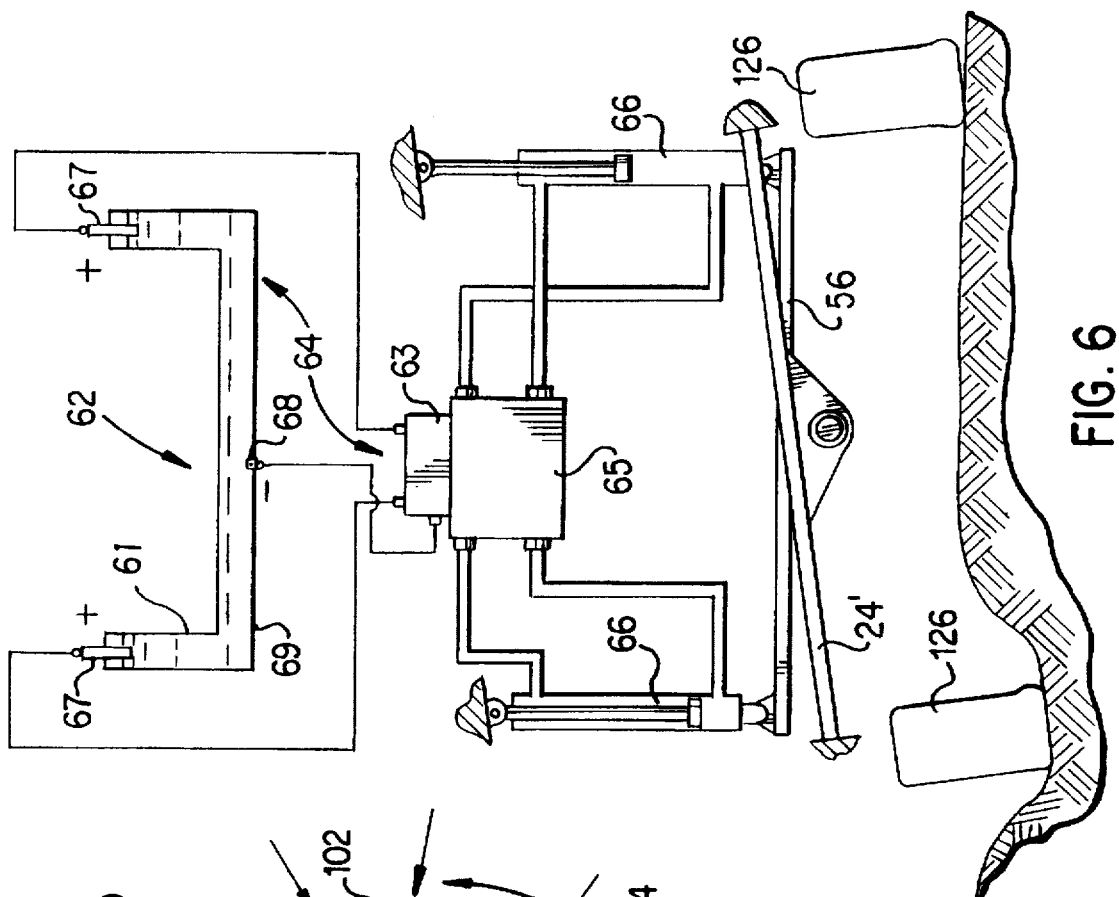
FIG. 6 is a schematic diagram of the leveling mechanism of the present invention.

As depicted in FIGS. 2 and 6, a leveling apparatus 62 is connected between plate 56 of stabilizing member 50 and the frame support member 22. The leveling apparatus includes a sensing device 64 for sensing whether or not plate 56 is substantially level. Sensing device 64 can be formed of any electric, electronic, microelectronic or other type mechanism for sensing a non-level condition and varying an electrical or other output accordingly, and, as shown by way of example, may be formed of a mercury switch 61 and a solenoid 63 connected to a power source (not shown). Mercury switch 61 includes a mercury filled tube 69, positive probes 67 at the ends of the tube, and a ground probe 68, the various probes being connected to the solenoid 63. Leveling apparatus 62 further includes hydraulic cylinders 66 actuated by the solenoid via a hydraulic valve 65 for maintaining plate 56 at a substantially level position. The hydraulic cylinders are preferably sized for quick response with minimal movement, such as, for example, with 2 inch strokes.

If a wheel of the vehicle falls into a crevice or is caused to shift, causing the plate 56 and the tube 69 to become unlevel by a predetermined amount, mercury in the tube contacts (or, in an alternative embodiment, comes out of contact with) one of the positive probes 67, thereby energizing solenoid 63 to actuate hydraulic valve 65 so as to move hydraulic cylinders 66 in opposite directions to return plate 56 (and tube 69) to a substantially level position. A substantially level position of plate 56 is maintained in this way throughout the pruning operation. As a result, inconsistencies in pruning are obviated, thereby maximizing results. Of course, a single hydraulic cylinder 66 could be utilized, and the hydraulic cylinder(s) could be manually controlled in lieu of automatic control with the mercury switch and solenoid arrangement. Also, other leveling mechanisms may be substituted for those described above.

One or more additional hydraulic cylinders 68 (FIGS. 3 and 5), controlled by the operator, are disposed between the frame support structure 43 or some other appropriate part of frame support member 22 and the flat plate member 32, the frame plate 20 or the front chassis or other appropriate part of the mobile platform. Cylinder(s) 68 causes the pruning apparatus to pivot about pin 38 to allow for forward or rearward tilting adjustment of the pruning apparatus during operation or transport.

Figure 1:
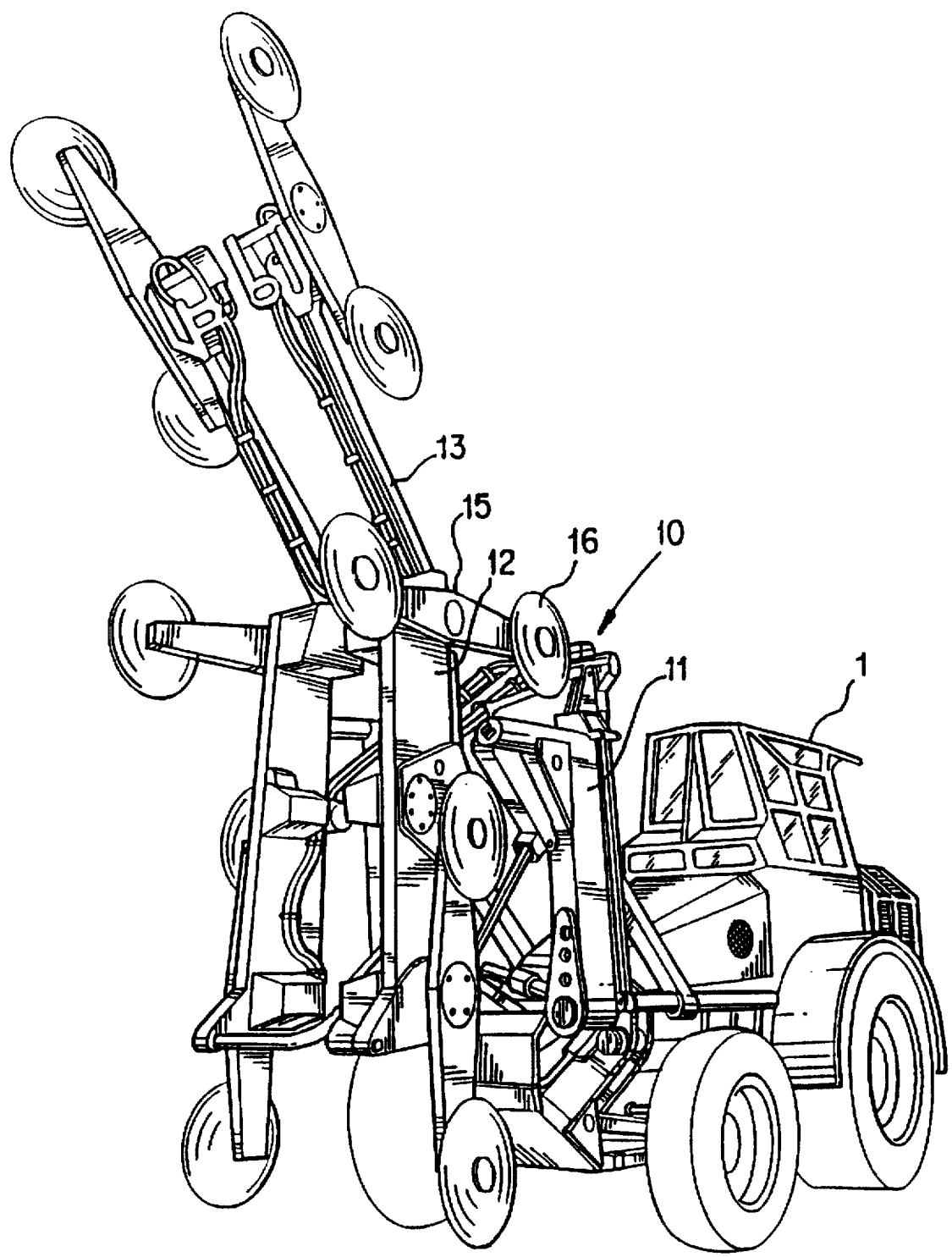
FIG. 1 is a perspective view of an exemplary, conventional pruning apparatus.
Figure 7:
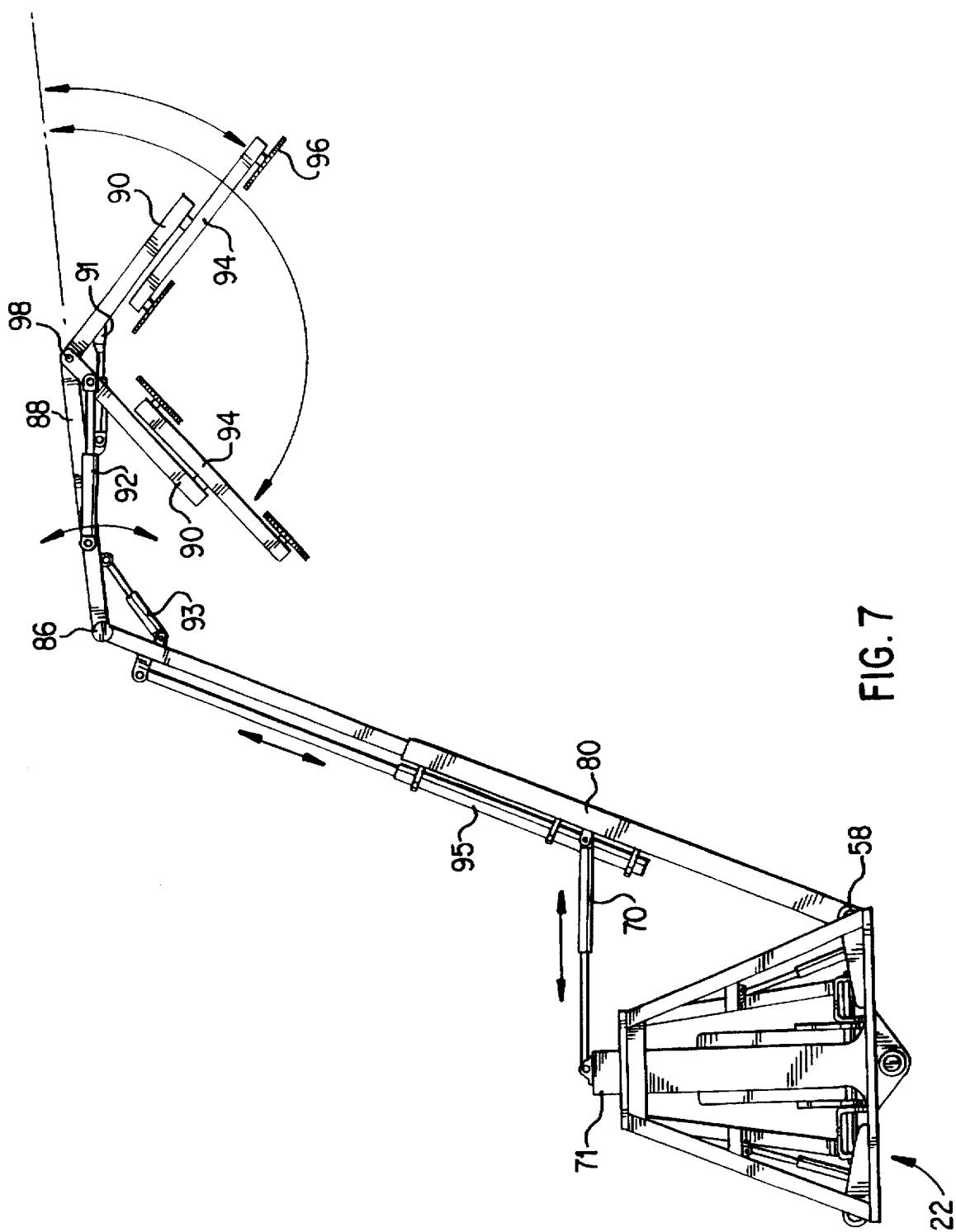
FIG. 7 is an alternative boom, blade support member and cutting blade structure in accordance with the present invention.

An alternative boom, blade support and cutting blade structure, in accordance with the present invention but usable with or without a leveling mechanism or other aspects of the present invention, is depicted in FIG. 7. In this alternative embodiment of the present invention, one or two first telescoping boom members 80 (one shown) are pivotally connected to plate 56 with bushing(s) 57 and pin(s) 59 through brackets 58, or to an alternative support structure which does not include a leveling mechanism. A hydraulic cylinder 70 is connected between central support member 71 (or some portion of a non-leveling support structure) and each boom member 80 for angular adjustment of the telescoping boom(s) 80, and another hydraulic cylinder 95 is used to extend and retract the telescoping boom. A second boom member 88 is pivotally connected to each telescoping boom 80 by a knuckle joint 86. A third boom member 90 is attached to the boom member 88 and rotatably supports a pair of blade support members 94. The relative angular positions of boom members 80, 88 and 90 are controlled by the operator by means of hydraulic cylinders 91, 92, 93. Each of the blade support members 94 rotatably supports a pair of circular cutting blades 96. Blade support members 94 and cutting blades 96 are rotated by means of motors, chains and belts in the same manner as in conventional boom, blade support and cutting blade structures, such as the ones depicted in FIGS. 1, 4 and 5.

As shown, third boom member 90 may be split into two boom members at a central pivot point 98 to enable pivotal adjustment of blade support members 94 relative to one another about a common axis. This arrangement permits selective adjustment of the relative angular positions of blade support members 94 using hydraulic cylinders 91 and 92. The two portions of third boom member 90 are preferably attached to opposite sides of boom member 88, to prevent interference between the blades 96 when blade support members 94 are positioned at a small angle to one another. This overall arrangement enables complete topping of a tree in a single pass. This provides a significant advantage over the prior art topper apparatuses in that two passes of the vehicle were required to perform the same operation (i.e., to top both sides of the tree to form an inverted-V shape). Moreover, because of the telescoping structure of the telescoping boom 80, the boom members 88 and 90 can be fully lowered and pivoted to perform hedging operations. As a result, only a single apparatus is required to perform both hedging and topping operations. Previously, an operator had to exchange a topping apparatus for a hedging apparatus or exchange vehicles. The present invention significantly reduces the amount of time required to perform both topping and hedging operations.

Figure 7A:
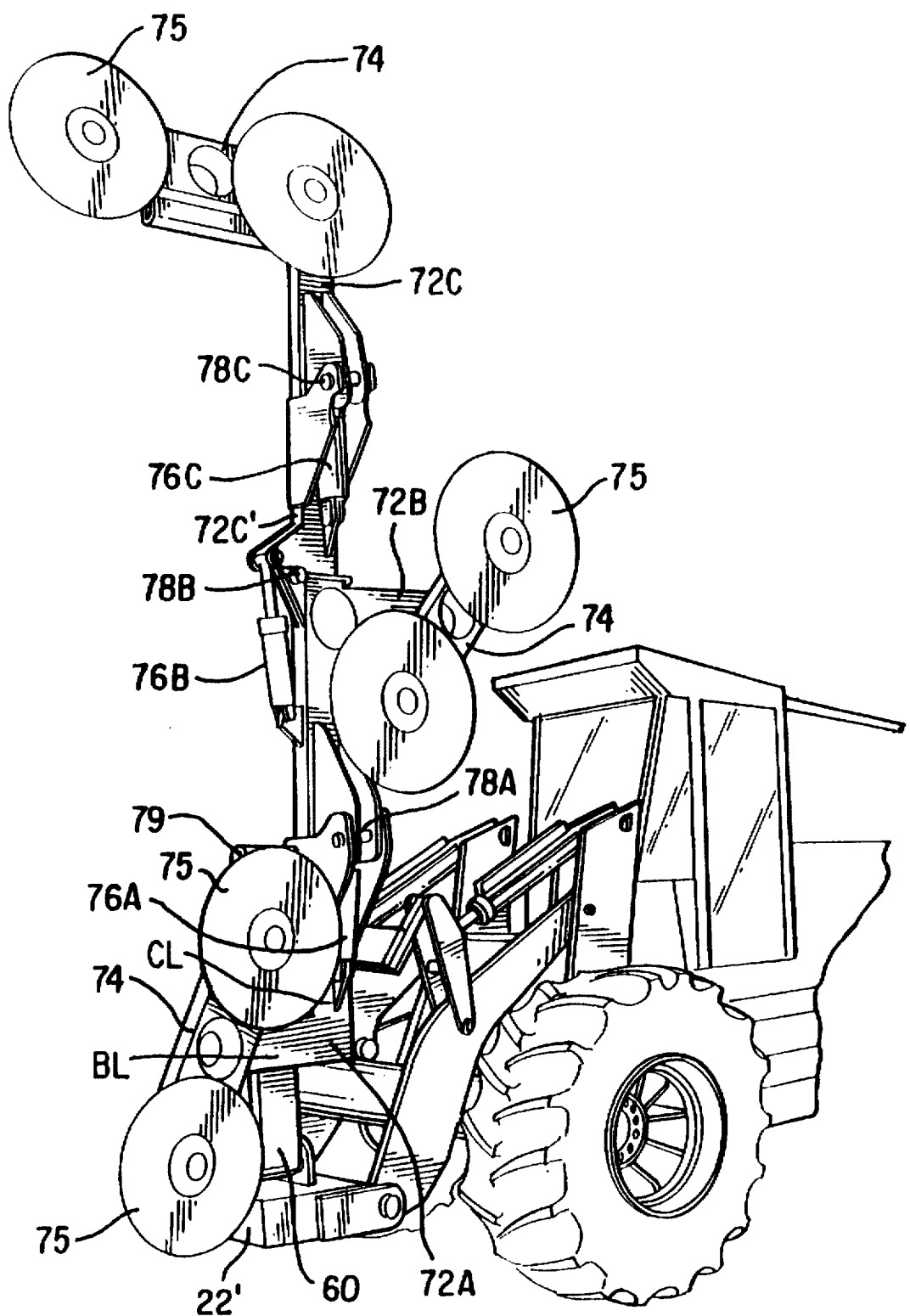
FIG. 7A is another alternative boom, blade support member and cutting blade structure in accordance with the present invention.

Yet another alternative boom, blade support and cutting blade structure, in accordance with the present invention but usable with or without a leveling mechanism or other aspects of the present invention, is depicted in FIG. 7A. Frame support member 22' is preferably fixed to a lifter of a conventional vehicle. In this embodiment, each of one or two main boom members 60 (one shown) is pivotally connected to frame support member 22' and supports three L-shaped blade boom members 72A, 72B, 72C. As in previous embodiments, a blade support member 74 is rotatably supported at an end of each L-shaped blade boom member 72A, 72B, 72C, and a circular cutting blade 75 is rotatably supported at each end of each blade support member 74.

First L-shaped blade boom member 72A is rotatably supported on main boom member 60 via a pivot pin 79, and a hydraulic cylinder (not shown) effects the position of first L-shaped blade boom member 72A. Second L-shaped blade boom member 72B is pivotably attached to first L-shaped blade boom member 72A via a first pivot connector 78A. First and second L-shaped blade boom members 72A and 72B pivot about pivot pin 79 and pivot connector 78A, respectively in planes perpendicular to the forward traveling direction of the vehicle. A hydraulic cylinder 76A, controlled by the operator, effects the relative position between first L-shaped blade boom member 72A and second L-shaped blade boom member 72B. The position of main boom member 60 is effected by a hydraulic cylinder between the frame support member and the main boom member, as shown and described in previous embodiments.

An interim boom extension 72C' is pivotally attached to second L-shaped blade boom member 72B via a second pivot connector 78B. Interim boom extension 72C' pivots about pivot connector 78B in a plane parallel to the forward travelling direction of the vehicle. The relative position of interim boom extension 72C' to second L-shaped blade boom member 72B is effected by a hydraulic cylinder 76B controlled by the operator.

Third L-shaped blade boom member 72C is pivotally attached to interim boom extension 72C' via a third pivot connector 78C. Third L-shaped blade boom member 72C pivots about pivot connector 78C in a plane perpendicular to the pivot plane of interim boom extension 72C'. The relative position of third L-shaped blade boom member 72C to interim boom extension 72C' is effected by a hydraulic cylinder 76C controlled by the operator.

The hydraulic cylinders 76A, 76B and 76C are preferably controllable from the cab of the vehicle along with the main vehicle controls so that the pruning apparatus can be raised, lowered and configured from inside the cab for optimal operation.

With continued reference to FIG. 7A, first L-shaped blade boom member 72A preferably includes a generally vertically disposed connector leg CL supporting pivot connector 78A and a generally horizontally disposed blade leg BL supporting a blade support member 74. The horizontally disposed blade leg preferably extends forwardly relative to the vehicle. Second and third L-shaped boom members 72B and 72C each similarly includes a connector leg and a blade leg. The blade leg of second L-shaped boom member 72B is also horizontally disposed but preferably extends rearwardly relative to the vehicle. Those of ordinary skill in the art could contemplate other configurations of the L-shaped blade boom members, and the invention is not meant to be limited to the illustrated embodiment. For example, the blade leg of second L-shaped blade boom member 72B could extend forwardly relative to the cab. In this instance, the blade leg is preferably long enough such that its respective blade support member 74 rotates at a location further from the vehicle than the other blade support members.

Pivot connectors 78A, 78B and 78C are disposed such that cutting blades 75 and blade support members 74 always rotate in different, non-overlapping orbits. The dimensions of each leg of the L-shaped blade boom members 72A, 72B and 72C and interim extension 72C' are also specified such that the respective areas encompassed by each of the rotating blade support members 74 do not intersect in any configuration. Thus, although in this structure, the blade support members and cutting blades are driven by means of motors, chains, belts and the like, this structure advantageously avoids the necessity of timing the rotating blade support members.

In any of the above described embodiments, the boom members can be fixed to the mobile platform or to one another with a coupler hook, enabling easy attachment and detachment of the boom members. For example, a coupler hook may be fixed to a lower portion of boom member 60 by a suitable means, and is shaped to hook on a corresponding member fixed to the mobile platform or stabilizing member. A pin is driven between a lower portion of the hook and the member to secure the attached boom member 60 to the mobile platform. Other coupler hook arrangements may also be used, such as the Caterpillar IT28 "Integral Quick Coupler." As a result, the boom members can be readily interchanged, thereby increasing the efficiency of the machine.

Figure 8:
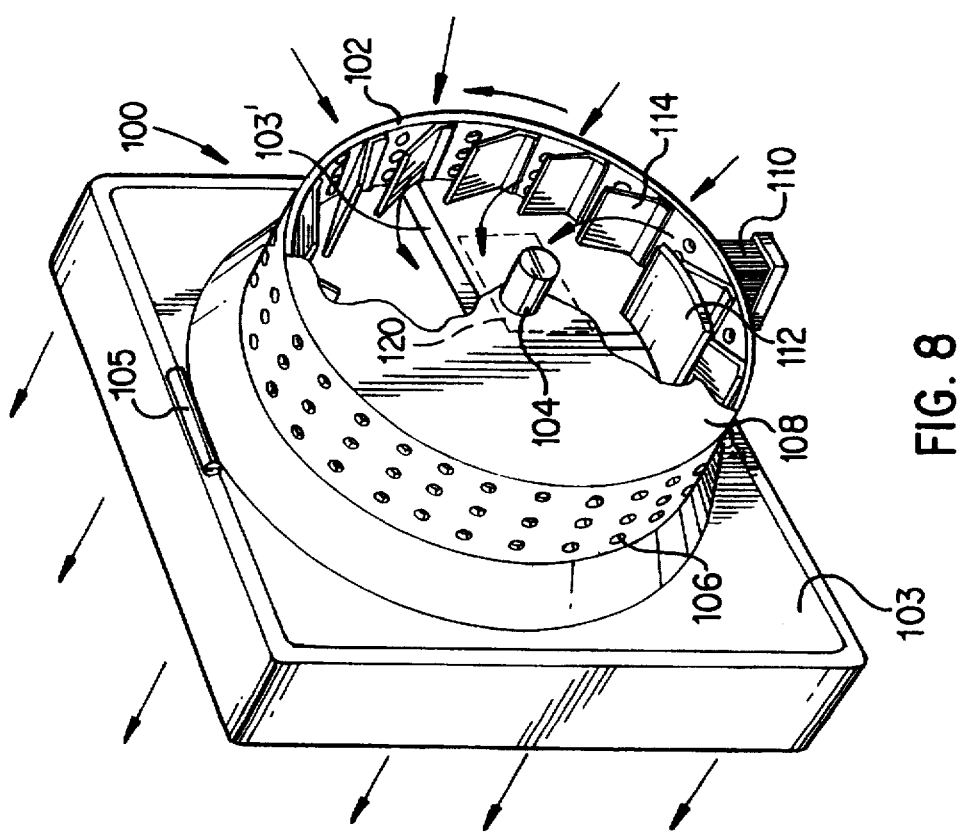
FIG. 8 is a perspective view of an automatic radiator cleaning device in accordance with the present invention.

Due to the nature of the pruning operations, sawdust and other particles can build up and clog the radiator or protective radiator screen or filter of an engine-driven mobile platform, such as a vehicle. Upon this occurrence, unless some automatic cleaning device is incorporated, the operator must stop the operation to clean the radiator to avoid overheating of the engine. Referring to FIG. 8, a radiator filter apparatus 100 is shown which is adapted to be attached to an engine radiator of a vehicle, such as during use in pruning operations. The radiator filter apparatus 100 includes a tubular filter 102 rotatably mounted, on the air inlet side of the radiator, to a spider structure 103' of a rectangular-to-round transition member 103 on a shaft 104. The tubular filter 102 has a plurality of holes 106 therethrough. The external end portion of the tubular filter is covered with a cover member 108 which causes all air drawn by the radiator to be filtered through holes 106 in tubular filter 102. The radiator filter apparatus (or at least the tubular filter portion) is preferably hinged to the vehicle by top, bottom or side hinge(s) 105 for ease of servicing.

A brush 110 is fixed to the radiator filter apparatus or the vehicle and is disposed in contacting relationship with the outside surface of the tubular filter. The brush 110 automatically removes any sawdust and other debris from the tubular filter 102 as the filter rotates. In a preferred embodiment, the tubular filter 102 includes a plurality of spaced blade members (i.e., vanes) 114 disposed on the inside surface of the tubular filter. The blade members 114 are arranged at an angle relative to the shaft 104. Air drawn across the radiator strikes the blades 114 and causes rotation of the tubular filter 102. In an alterative embodiment, a conventional motor 120 can be used to rotate shaft 104 of tubular filter 102.

The radiator filter apparatus 100 further preferably includes a baffle 112, fixed to transitional member 103 or some other appropriate part of the apparatus or the vehicle, and extending, for example, over the internal surface of tubular filter 102 to cover those holes 106 positioned over brush 110. The baffle 112 is thus juxtaposed with respect to brush 110 so as to prevent debris removed by the brush from re-accumulating on the tubular filter.

Figure 8A:
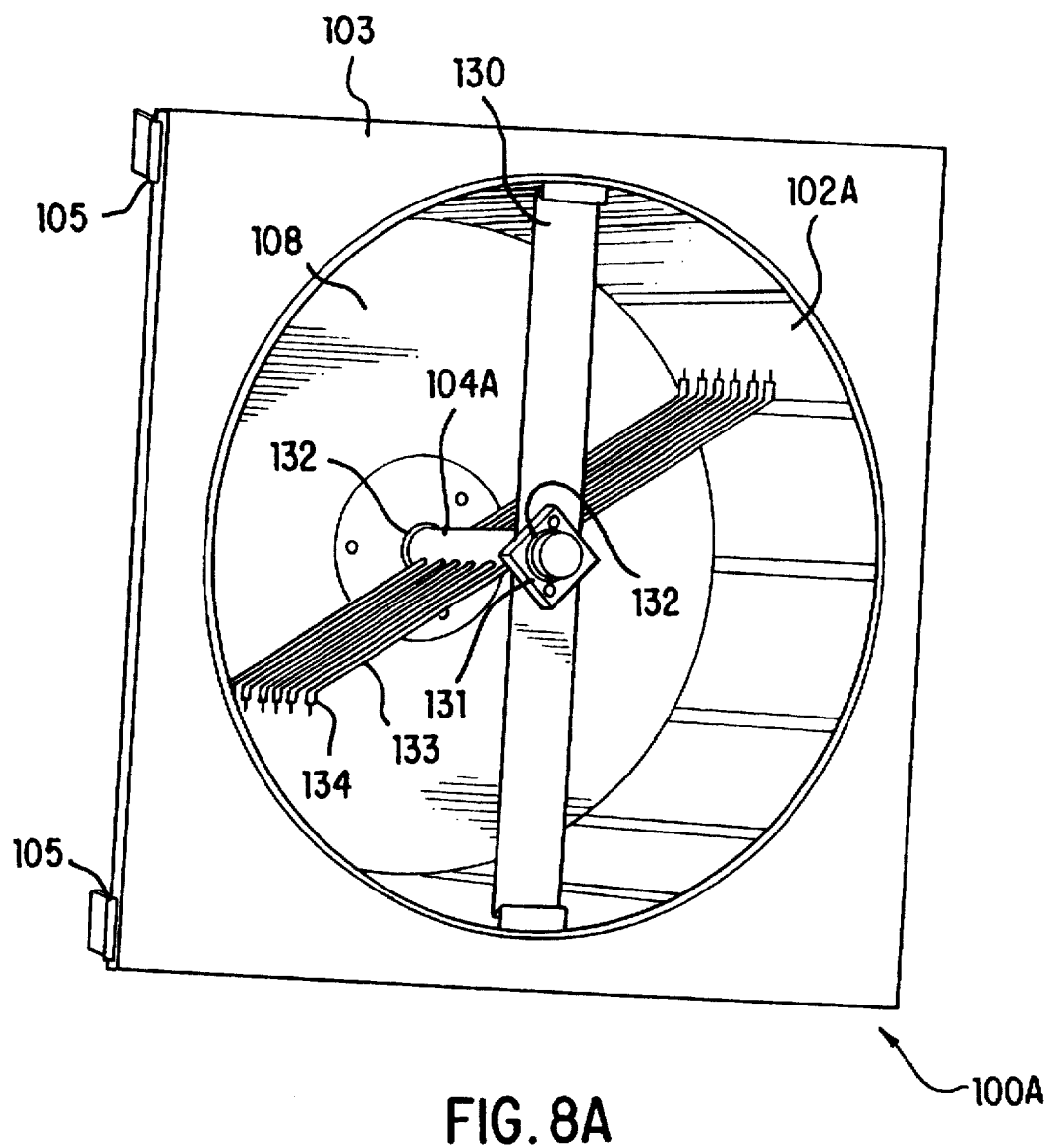
FIG. 8A is a perspective view of an alternative automatic radiator cleaning device in accordance with the present invention.

Referring to FIG. 8A, an alternative radiator cleaning apparatus 100A is illustrated, wherein like reference numerals are utilized to designate similar elements to those described above in connection with FIG. 8. In this arrangement, tubular filter 102A is formed of a screen mesh material. Cover member 108 ensures that all air drawn by the radiator will be filtered through the screen mesh material of tubular filter 102A. A hollow shaft 104A is freely rotatably disposed between cover member 108 and a supporting member 130 fixed across the diameter of the tubular filter opposite cover member 108. A fixing bracket 131 fixes the rotatable shaft 104A to supporting member 130 via a bushing 132. A second bushing 132 is disposed in the cover member 108 at an opposite end of shaft 104A.

A plurality of hollow nozzle shafts 133 extend radially from rotatable shaft 104A, and a corresponding plurality of pairs of air nozzles 134 are disposed at opposite ends of nozzle shafts 133.

Figure 8B:
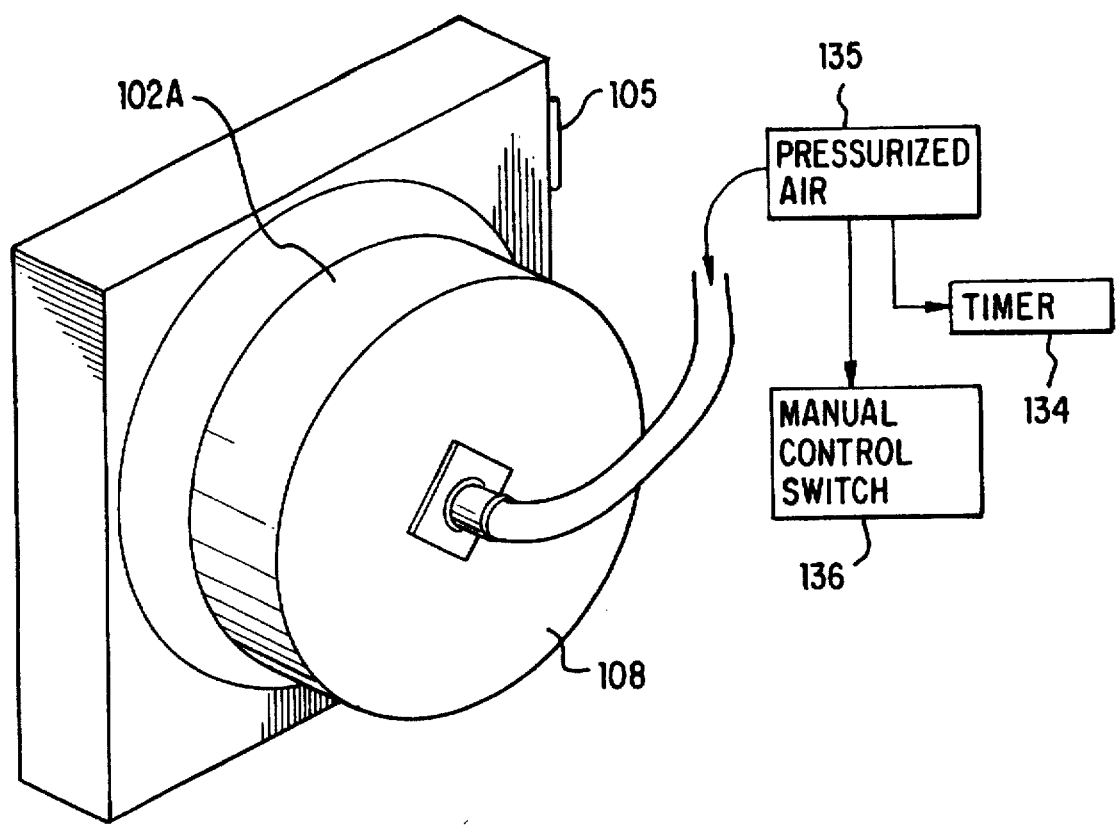
FIG. 8B is a perspective view of the outside of the automatic radiator cleaning device of FIG. 8A.

Referring to FIG. 8B, shaft 104A is coupled to a source of pressurized air 135, from which pressurized air is directed through shaft 104A, nozzle shafts 133 and air nozzles 134. Pressurized air source 135 provides a burst of pressurized air for about 1–5 seconds, and preferably about 2 seconds (depending on whether the debris is wet or dry) in accordance with an actuation signal from a timer 137 or an operator controlled manual control switch 136. Nozzles 134 are disposed at an angle, preferably about 45°, relative to nozzle shafts 133.

Nozzle shafts 133 are preferably formed of galvanized steel pipe, having a 45° steel elbow joint fixed to each end. Nozzles 134 have any suitable structure and are fixed to the steel elbow joints of nozzle shafts 133. Similarly, shaft 104A is formed of steel and has a plurality of apertures 104A' extending along its length. Apertures 104A' communicate with nozzle shafts 133 and permit pressurized air to flow therethrough. Alternatively, nozzle shafts 133 may be formed of a solid steel supporting member, wherein flexible tubing or the like is fixed to the nozzle shafts and communicates between shaft 104A and nozzles 134.

When pressurized air source 135 is actuated, a burst of pressurized air flows through shaft 104A and nozzle shafts 133 to air nozzles 134. Due to the relative angle of air nozzles 134 relative to nozzle shafts 133, and the free rotatability of shaft 104A, the force of the pressurized air burst leaving nozzles 134 at an angle causes shaft 104A to rotate, thereby enabling nozzles 134 to blow pressurized air across the entire circumference of filter 102A. Alternatively, a motor can be used to rotate shaft 104A.

The radiator cleaning apparatus 100A could include a hood (not shown) to prevent rain or other liquids (such as juice from fruit that is inadvertently cut during hedging) from soaking the debris resting on the filter 102A between air bursts.

The radiator cleaning apparatuses 100, 100A enable consistent filtering of the air drawn by the radiator without clogging, thereby further increasing the efficiency of the pruning apparatus.

The pruning apparatus is preferably carried by a vehicle. However, the invention is not meant to be limited thereto. Namely, the present invention may also be used in conjunction with a trailer, a push cart or the like. Any suitable mobile apparatus will suffice.

Figure 9:
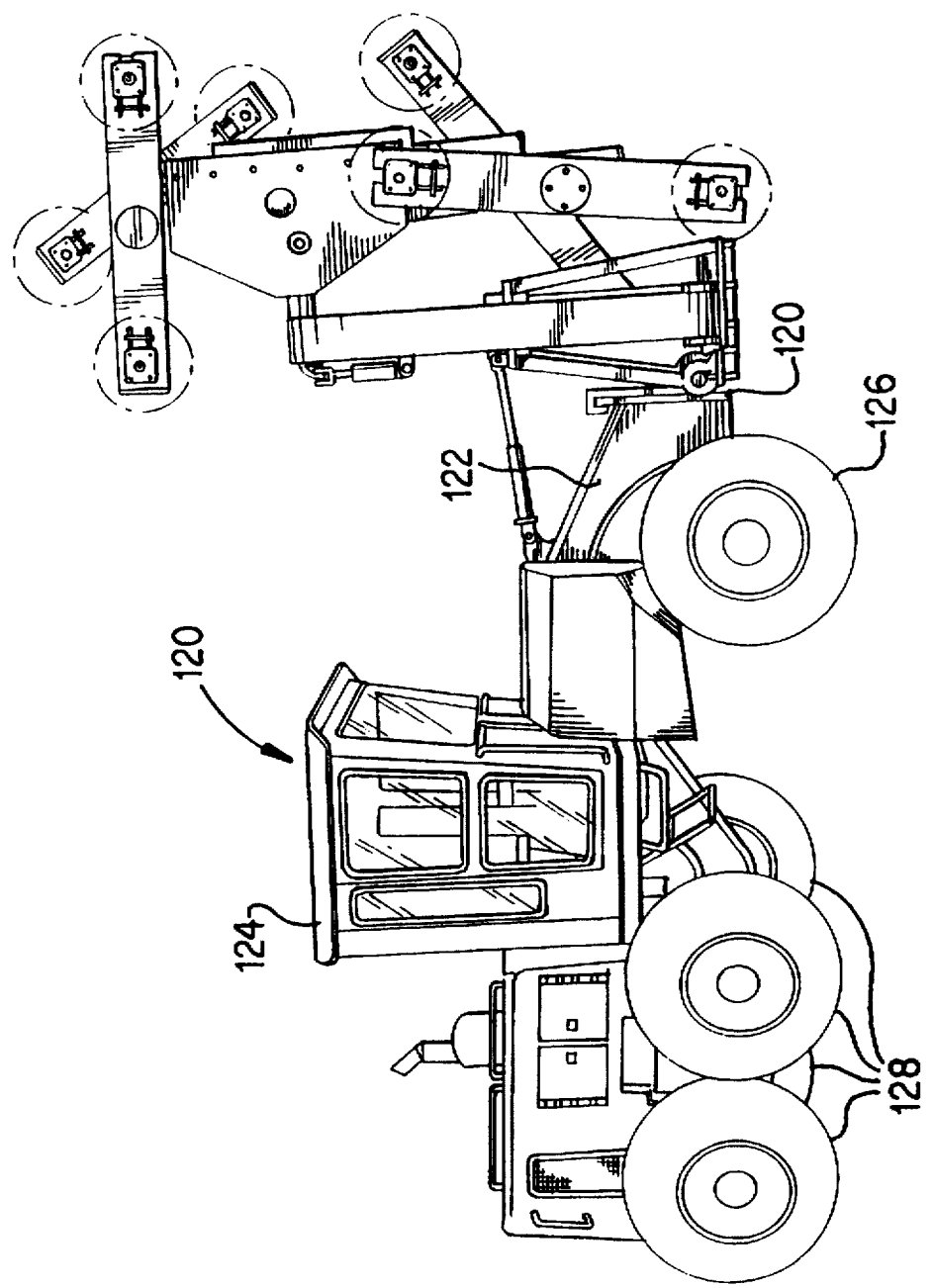
FIG. 9 is a perspective view of an exemplary vehicle mounted embodiment of the pruning apparatus of the present invention.

Referring to FIG. 9, an exemplary vehicle is shown. The vehicle 120 has some of the configuration and features of a grader (see, e.g., Caterpillar 140G Motor Grader brochure), but with a truncated front chassis 122 to specifically adapt the vehicle for use in pruning operations. In other words, frame plate 20 is disposed at a distance in front of cab 124 which is substantially less than the distance in a standard commercial motor grader. This enables a stable support for the pruning apparatus, while permitting the vehicle to more easily maneuver through orchards. Moreover, as in conventional motor graders, vehicle 120 includes two front wheels 126 (one shown) and at least four rear drive wheels 128. The front wheels are mounted on an axle which oscillates laterally of the vehicle and the rear wheel tandems are mounted on full-floating axles. The front wheels 126 turn relative to the vehicle frame, and the cab 124 and front frame 122 articulate relative to the rear frame, to permit various maneuvers with the vehicle. Thus, vehicle 120 is significantly more stable, flexible and powerful than the pruning vehicles of the prior art.

Figure 10:
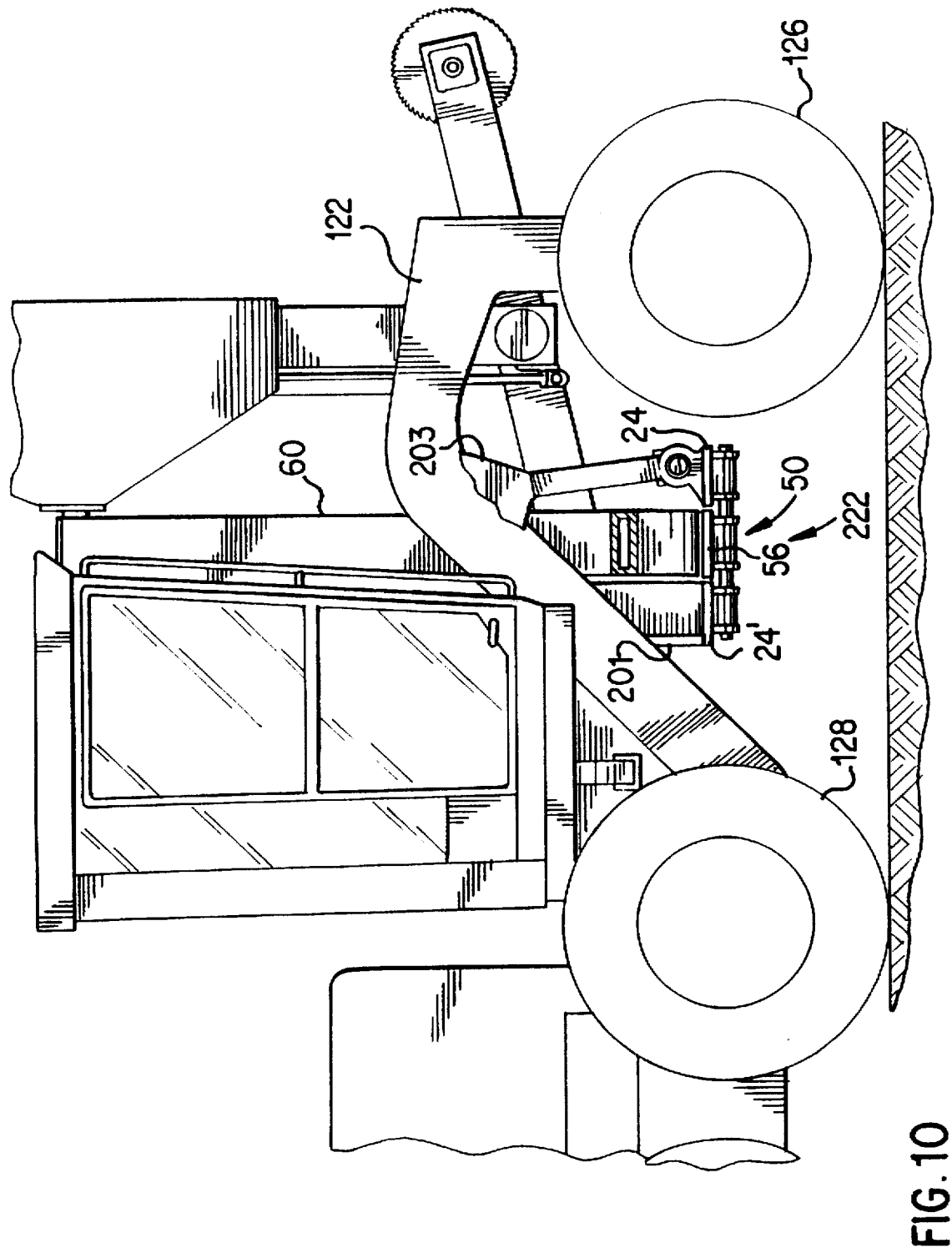
FIG. 10 is a side elevation view (with booms removed on near side) of a modified form of the vehicle of FIG. 9.
Figure 11:
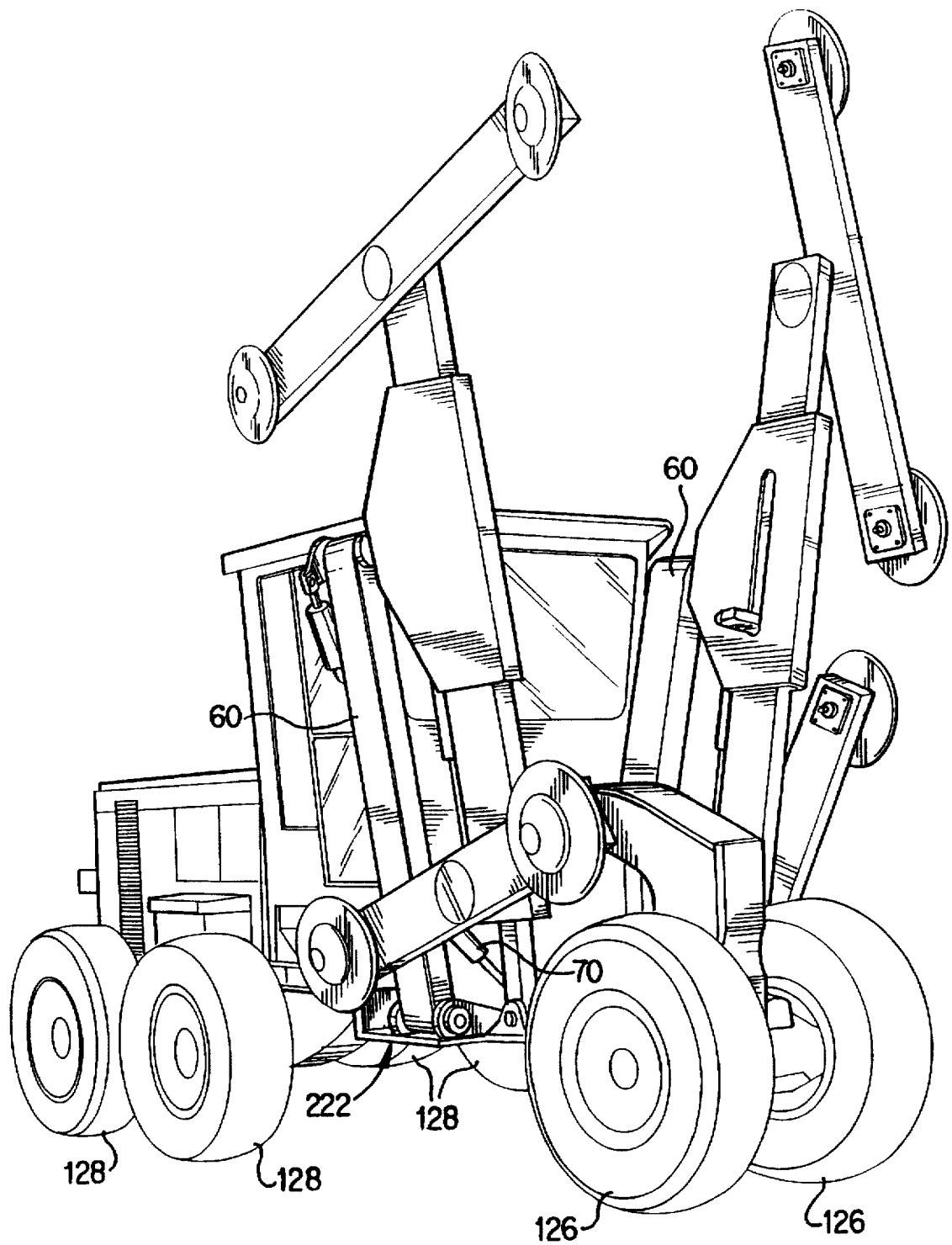
FIG. 11 is a perspective view of the vehicle of FIG. 10.

The vehicle of FIG. 9 may be further modified as shown in FIGS. 10 and 11 for even greater maneuverability. In its modified form, the front chassis 122 is even further truncated, and the distance between front wheels 126 is substantially reduced to shorten the turning radius. A modified frame support member 222 is mounted to the vehicle chassis just in front of cab 124 by means of structural members 201 and 203. Frame support member 222 is otherwise very similar to previously described frame support member 22, and accordingly like reference numerals are utilized to identify similar features. Because of the disposition of support member 222 on the vehicle chassis, hydraulic cylinders 70 of first boom members 60 must be more directly connected to plate 56 rather than via the central support member 71 of previously described support member 22.

With the modified form of vehicle depicted in FIGS. 10 and 11, there is the possibility that front wheels 126 could come into undesired contact with the boom, blade support and cutting blade structure during vehicle turning. To prevent any such contact, a switching apparatus, such as the one depicted in FIGS. 12 and 13, is utilized to automatically move the boom structure away from the wheels during turning. In this arrangement, two cams 301 are mounted on tie rod 303 between front wheels 126. When front wheels 126 are turned, one of cams 301 engages a spring-loaded trigger 305 of a switch 307. Switch 307 is electrically connected to a solenoid 309 and power source (not shown) to move lower ends of second boom members 72 outward by means of hydraulic cylinders (such as cylinders 76 depicted in FIG. 4) via a hydraulic valve 311. The outward movement of the lower ends of boom members 72 is limited by limit switches 313, and the inward, return movement of the lower ends of boom members 72, when wheels 126 are returned to their straight position and cams 301 no longer contact trigger 305 of switch 307, is limited by means of limit switches 315. Thus, when front wheels 126 of the vehicle are turned, the lower portions of boom members 72 are automatically moved outward to avoid contact with wheels 126, and when wheels 126 are returned to a straight position, the lower portions of boom members 72 are automatically returned to their normal operating position.

Switches 307, 313 and 315 are readily commercially available components, and are electrically interconnected with solenoid 309 in a conventional manner. An electromagnetic, microelectronic or other type switch could be substituted for switch 307.

Figure 14:
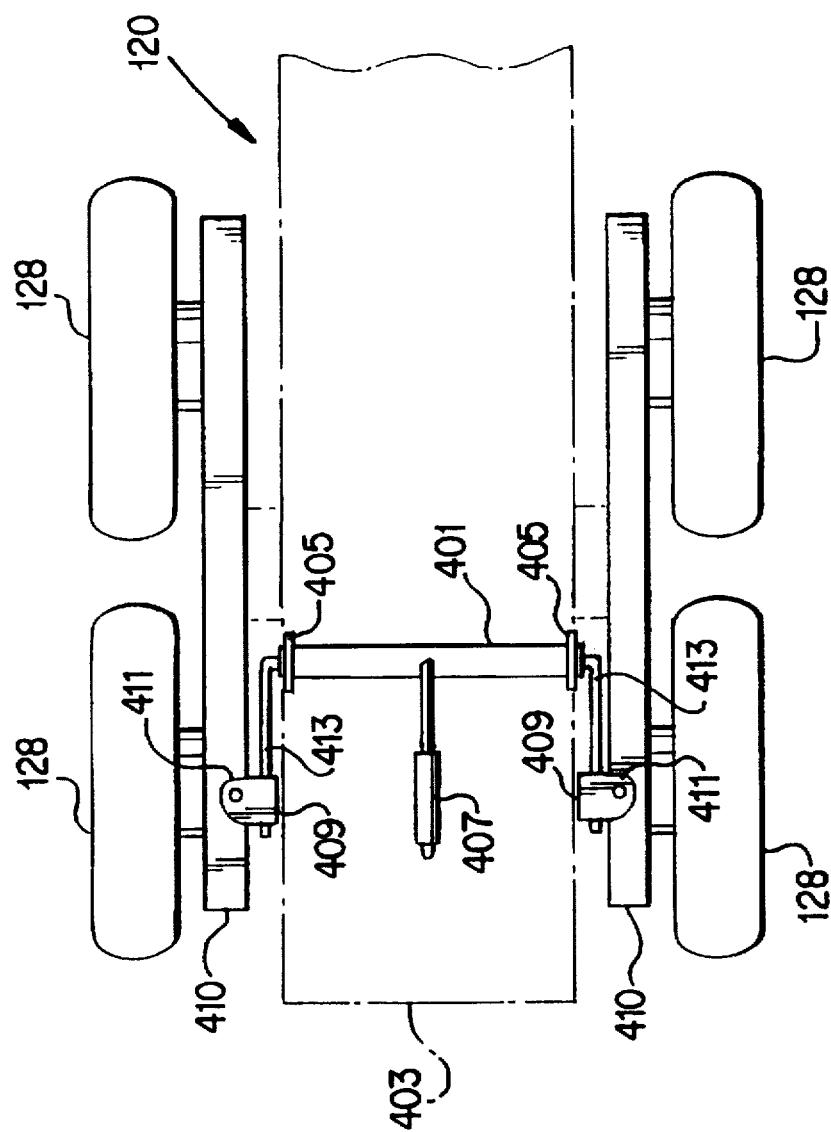
FIG. 14 is a top view of a rear wheel tandem lifting apparatus in accordance with the present invention.

To further assist in turning maneuverability under extreme circumstances, a rear tandem lifting apparatus can be utilized as depicted in FIG. 14. For this purpose, a rotatable shaft 401 is mounted to the rear chassis 403 of vehicle 120 in bushings 405. Shaft 401 can be rotated up to 90° by means of a hydraulic cylinder 407 which is manually controlled by the operator. One end of cylinder 407 is fastened to rear vehicle chassis 403, and the other end of cylinder 407 is connected to shaft 401.

Polyester belt loops 409, or alternatively loops formed from cables, chains, etc., are attached to rear wheel tandems 410 with fasteners 411 of any appropriate form. Rods 413 extend from the ends of shaft 401 between the vehicle chassis 403 and tandems 410 and extend through loops 409. Sufficient slack is provided in loops 409 such that, when shaft 401 is in its non-rotated, non-operative position, tandems 410 are free to move up and down in their normal fashion on their full-floating axles. When shaft 401 is rotated, rods 413 take up the slack in the loops 409 and raise the tandems 410 by means of the loops by a small amount, for example one inch. This reduces the loading on the rearmost wheels 128 and increases the loading on the forwardmost wheels 128, to aid in turning of the vehicle.

Although the invention has been described in detail, it is not meant to be limited to the specific embodiments described. Those skilled in the art may contemplate various alternatives that are within the spirit and scope of the invention, which is outlined in the following claims.

What is claimed is:

1. A tubular cleaning device for cleaning a vehicle engine radiator during operation of said vehicle engine radiator, said cleaning device comprising:

a tubular filter mounted adjacent said radiator, said filter having an inside surface and an outside surface;

a plurality of holes extending through said filter;

at least one air nozzle disposed inside said filter and fixed to a corresponding at least one hollow nozzle shaft, said nozzle shaft extending radially away from a hollow rotatable support shaft centrally disposed inside said filter, said support shaft being connected to a source of pressurized air; and means for rotating said support shaft, wherein upon actuation of said pressurized air source, said air nozzle directs pressurized air toward said inside surface of said filter while said rotating means rotates said support shaft and thereby said nozzle shaft and said air nozzle, and wherein said means for rotating said support shaft and said pressurized air source operate simultaneously with said vehicle engine radiator during said operation of said vehicle engine radiator, wherein said air nozzle is disposed at an angle relative to said nozzle shaft such that pressurized air exiting said air nozzle causes said support shaft, nozzle shaft and air nozzle to rotate.

2. The radiator cleaning device of claim 1, wherein said at least one air nozzle is disposed at a 45° angle relative to said nozzle shaft.

3. The radiator cleaning device of claim 1, further comprising a motor for rotating said support shaft while said source of pressurized air is being supplied to said at least one air nozzle.

4. A tubular cleaning device for cleaning a vehicle engine radiator during operation of said vehicle engine radiator, said cleaning device comprising:

a tubular filter mounted adjacent said radiator, said filter having an inside surface and an outside surface;

a plurality of holes extending through said filter;

at least one air nozzle disposed inside said filter and fixed to a corresponding at least one hollow nozzle shaft, said nozzle shaft extending radially away from a hollow rotatable support shaft centrally disposed inside said filter, said support shaft being connected to a source of pressurized air; and means for rotating said support shaft, wherein upon actuation of said pressurized air source, said air nozzle directs pressurized air toward said inside surface of said filter while said rotating means rotates said support shaft and thereby said nozzle shaft and said air nozzle, wherein said means for rotating said support shaft and said pressurized air source operate simultaneously with said vehicle engine radiator during said operation of said vehicle engine radiator, and wherein said at least one air nozzle comprises a plurality of air nozzles and said at least one hollow nozzle shaft comprises a plurality of nozzle shafts, each of said nozzle shafts supporting a pair of air nozzles, one each at opposing ends of said nozzle shaft, said air nozzles being disposed at an angle relative to said nozzle shafts, such that pressurized air exiting from said air nozzles causes said support shaft, nozzle shaft and air nozzles to rotate.

5. The radiator cleaning device of claim 4, further comprising means for automatically actuating said pressurized air source at predetermined intervals of time.

6. The radiator cleaning device of claim 4, further comprising means for manually actuating said pressurized air source at operator selected intervals of time.

7. The radiator cleaning device of claim 4, wherein said air nozzles are disposed at a 45° angle relative to said nozzle shafts.

8. A cleaning device comprising:

a tubular filter having an inside surface and an outside surface;

a plurality of holes extending through said tubular filter;

at least one air nozzle disposed inside said filter and fixed to a corresponding at least one hollow nozzle shaft, said nozzle shaft extending radially from a hollow support shaft centrally disposed inside said tubular filter, said support shaft being connected to a source of pressurized air; and means for causing rotation of said support shaft relative to said filter, wherein upon actuation of said pressurized air source, said air nozzle directs pressurized air toward said inside surface of said filter while said rotating means causes relative rotation of said support shaft and said filter and thereby said nozzle shaft and said air nozzle, wherein said at least one nozzle comprises a plurality of air nozzles and a plurality of nozzle shafts, each of said nozzle shafts supporting a pair of air nozzles, one each at opposing ends of each of said nozzle shafts, and wherein said means for causing rotation of said air nozzles includes disposing said pairs of nozzles at an angle relative to said nozzle shafts such that pressurized air exiting said air nozzles causes said support shaft, nozzle shafts and air nozzles to rotate.

9. The cleaning device of claim 8, wherein said tubular filter is mounted adjacent a vehicle engine radiator.

10. The cleaning device of claim 8, wherein said tubular filter is mounted adjacent a vehicle engine intake.

11. The cleaning device of claim 8, further comprising means for automatically actuating said pressurized air source at predetermined intervals of time.

12. The cleaning device of claim 8, further comprising means for manually actuating said pressurized air source at operator selected intervals of time.

13. The cleaning device of claim 8, wherein said air nozzles are disposed at a 45° angle relative to said nozzle shafts.

14. The cleaning device of claim 8, further comprising a motor for rotating the support shaft while said source of pressurized air is being supplied to said at least one air nozzle.

15. A cleaning device comprising:

a tubular filter having an inside surface and an outside surface;

removal means for removing contaminants from the tubular filter; and motive means for causing relative rotative movement between the tubular filter and the removal means, wherein said removal means includes a plurality of air nozzles and a plurality of nozzle shafts, each of said nozzle shafts supporting a pair of air nozzles, one each at opposing ends of each of said nozzle shafts, and wherein said motive means for causing relative movement between the tubular filter and the removal means includes, at least in part, disposing said pairs of nozzles at an angle relative to said nozzle shafts such that pressurized air exiting said air nozzles causes said support shaft, nozzle shafts and air nozzles to rotate.

16. The cleaning device of claim 15, wherein said motive means includes a motor for rotating the plurality of nozzles as the plurality of nozzles are provided with said pressurized air.

* * * * *